United States Patent [19]

Föhl

[11] Patent Number: 4,744,107
[45] Date of Patent: May 17, 1988

[54] SAFETY HELMET AND DETACHABLE ACCESSORY

[76] Inventor: Artur Föhl, Auf der Halde 28, 7060 Schorndorf, Fed. Rep. of Germany

[21] Appl. No.: 713,019

[22] Filed: Mar. 18, 1985

[30] Foreign Application Priority Data

Mar. 16, 1984 [DE] Fed. Rep. of Germany ....... 3409786

[51] Int. Cl.$^4$ .................................................. A42B 3/02
[52] U.S. Cl. .......................................... 2/422; 2/424; 24/621
[58] Field of Search ................... 2/424, 422, 425, 423, 2/10, 6, 8, 12, 185 R, 199, 410; 24/621, 662, 622, 165

[56] References Cited

U.S. PATENT DOCUMENTS

| | | | |
|---|---|---|---|
| 2,793,366 | 5/1957 | Kleinman | 2/424 X |
| 2,907,138 | 10/1959 | Kolwicz | 2/185 R |
| 3,049,716 | 8/1962 | Stegeman | 2/12 X |
| 3,614,815 | 10/1971 | Nysten | 24/662 |
| 3,797,042 | 3/1974 | Gager, Jr. | 2/10 |
| 4,117,553 | 10/1978 | Bay | 2/10 |
| 4,333,180 | 6/1982 | Bay | 2/10 |
| 4,434,514 | 3/1984 | Sundahl et al. | 2/425 |
| 4,584,721 | 4/1986 | Yamamoto | 2/424 |

*Primary Examiner*—Peter Nerbun
*Attorney, Agent, or Firm*—Herbert L. Lerner; Laurence A. Greenberg

[57] ABSTRACT

A safety helmet includes a helmet shell, at least one accessory, and at least one plug connection for connecting the accessory to the helmet shell being detachable with a given opening force, each plug connection including an elastic plug having a socket formed therein and being fixed in an opening formed in the helmet shell, and a plug nipple fastened to the accessory being insertible and lockable in the socket.

7 Claims, 1 Drawing Sheet

SAFETY HELMET AND DETACHABLE ACCESSORY

The invention relates to a safety helmet, especially a crash helmet, having a helmet shell, at least one accessory such as a protective shield, spoiler or the like and a plug connection connecting the accessory to the helmet shell, being detachable with a given opening force.

Conventional safety helmets of this type, particularly crash helmets for bicycle riders, skiers and the like, are formed of a helmet shell which is matched to the shape of the head, is dimensionally stable, is provided with a surface coating such as varnish, and has an adjustable chin strap fastened thereto. Such safety helmets can be equipped with accessories, such as a spoiler-like transparent protective shield. Snap or button-like plug connections serve for detachably fastening such a shield, which is essentially bent in a U shape. These plug connections are detachable in such a manner that the shield is separated from the helmet shell with a given detachment force, in the event of a crash. The plug connections are substantially formed of a metallic plug socket which is riveted to the outer surface of the helmet shell, as well as a plug nipple which is also metallic, which can be plugged into the plug socket, and which can be locked. Practice has shown that the manufacturing costs, particularly for fastening the plug socket, are considerable, and also that damage to the varnished surface of the helmet shell, for instance, can be expected. It has also been found that in the plugged-in condition, the metallic snap or button plug connections cause troublesome noise due to the play existing between the individual parts of the plug connections, i.e. between the plug socket and the plug nipple.

It is accordingly an object of the invention to provide a safety helmet, especially a crash helmet, which overcomes the hereinaforementioned disadvantages of the heretofore-known devices of this general type, in such a manner that damage to the surface of the helmet shell as well as troublesome clatter noise are reliably prevented, while the individual parts of the plug connection between the helmet shell and the accessory can be produced and assembled in a simple and cost-saving way.

With the foregoing and other objects in view, there is provided a safety helmet, especially a crash helmet, comprising a helmet shell, at least one accessory, such as a protective shield, spoiler or the like, and at least one plug connection for connecting the accessory to the helmet shell being detachable with a given opening force, each plug connection including an elastic plug having a socket formed therein and being pushed and fixed in an opening formed in the helmet shell in a form or force-locking menner, and a plug nipple fastened to the accessory being pushable or insertible and lockable in the socket and held therein. A form-locking connection is one which is accomplished due to the shape of the parts alone, while a force-locking connection has parts which push against each other.

In the safety helmet according to the invention, the elastic plugs with sockets which may be formed of rubber, are pushed into the openings of the completed helmet shell and secured there, which can be done completely without tools. Mechanical damage to the helmet shell or its surface is therefore reliably avoided. By using elastic material, all clatter is avoided with certainty after the helmet shell and the accessory, which may be a protective shield, are joined together, while it is assured that the accessory may be detached from the helmet shell with a predetermined separating force. In the structure according to the invention, at least part of the plug connection is omitted, as compared to the prior art structure.

In accordance with another feature of the invention, the plug has an annular shape and has a circumferential groove formed therein with which it snaps into the opening in the helmet shell. Due to the elasticity of the plug socket, pushing the plug into the prefabricated openings in the helmet shell presents no difficulties ofany kind and can be done by hand.

In accordance with a further feature of the invention, the socket has a diameter or width being slightly smaller than the maximum diameter or width of the plug nipple. Due to this feature and due to the elasticity of the plug, it is possible to obtain a secure and clatter-free locking of the plug nipples in the plug sockets without the existence of special detent springs or the like.

In accordance with an added feature of the invention, the plug nipple has an end disposed at the accessory and a free end, the free end having an enlargement with a width being greater than the diameter of the socket. This provides form-locking and force-locking detent action.

In accordance with an additional feature of the invention, the plug nipple is a pin or sleeve-shaped part jammed or riveted into the accessory.

In accordance with again another feature of the invention, the plug nipple is formed of a rivet-shaped pin part with a head and a sleeve part joined to or pressed on the pin part, the accessory being disposed between the pin and sleeve parts.

In accordance with again an added feature of the invention, the pin part is loosely disposed in an opening formed in the accessory, and including an elastic securing element disposed on the plug nipple holding the plug nipple on the accessory.

In accordance with a concomitant feature of the invention, the plug nipple is integral with the accessory. In this manner, an important assembly step, namely the connection of the plug nipple to the accessory, may be omitted.

Other features which are considered as characteristic for the invention are set forth in the appended claims.

Although the invention is illustrated and described herein as embodied in a safety helmet, especially a crash helmet, it is nevertheless not intended to be limited to the details shown, since various modifications and structural changes may be made therein without departing from the invention and within the scope and range of the claims.

The construction and method of operation of the invention, however, together with additonal objects and advantages thereof will be best understood from the following description of specific embodiments when read in connection with the accompanying drawings, in which.

Figure 1:
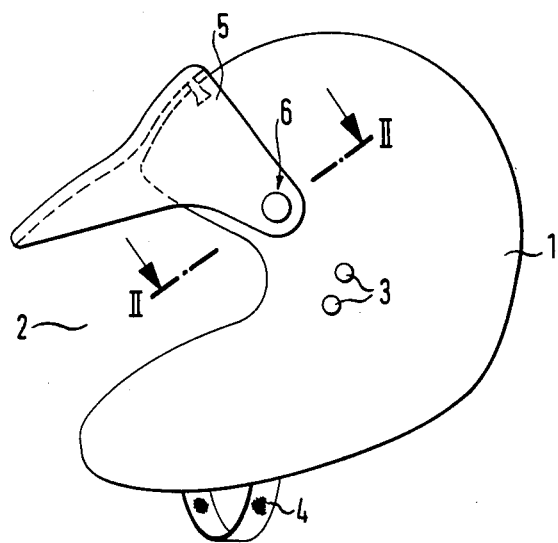
FIG. 1 is a diagrammatic, side-elevational view of the safety helmet of the invention.

Referring now to the figures of the drawings in detail and first particularly to FIG. 1 thereof, there is seen a side view of a safety helmet, including a helmet shell 1 with an opening at the bottom thereof fitting the shape of the head, a viewing opening 2, and a chin strap 4 which may be fastened, for instance, at points 3. A shield 5 which is bent with an essentially C-shaped cross-section, is connectable to the helmet shell 1 by a plug connection 6. The outer surface of the shield 5 may have a varnish coating thereon. In place of or in addition to the shield 5, another accessory may also be fastenable to the helmet shell, such as a so-called spoiler or the like. An accessory of this type, such as the shield 5, is plugged on the outside of the helmet shell 1, for which purpose connecting elements which project beyond the outer surface of the helmet shell are required. The plug connection between the accessory, i.e. the shield 5 and the helmet shell 1, is to be of such a nature that, in the event of a crash, the accessory is automatically detached from the helmet shell 1 when a given detachment force is encountered, in order to prevent injuries. For this purpose, a plug connection which is illustrated in greater detail in the following figures is provided.

Figure 2:
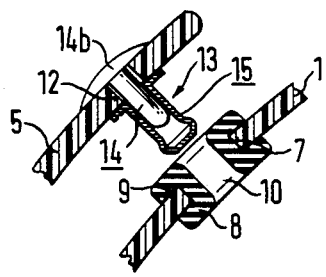
FIGS. 2 and 3 are fragmentary cross-sectional views of a plug connection of the safety helmet before and after joining.
Figure 3:
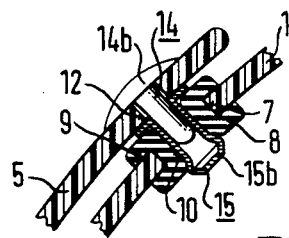
Figure 4:
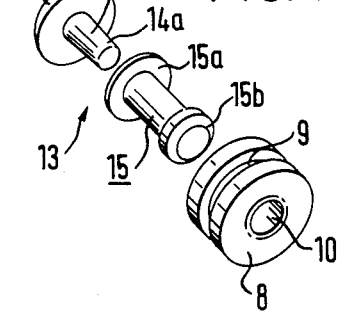
FIG. 4 is an exploded perspective view of the individual parts of the plug connection.

In the embodiment according to FIGS. 2 to 4, the helmet shell 1 has a circular opening 7 on each of two opposite sides, into which a plug or plug socket 8 formed of rubber-elastic material is plugged and snapped-in. The plug socket is of annular or sleeve-like construction and has a circumferential groove 9 formed therein. The plug socket 8 is engaged in the groove 9 in the circular opening rim of the shell 1 at the opening 7, if the plug socket 8 is pushed into the opening 7 of the circular opening rim 7, thus establishing a stable connection between the helmet shell 1 and the plug socket 8. The plug or plug socket 8 also has a plug opening or socket 10 with rounded opening edges in the center thereof. A plug nipple 13 is again supported and fastened at two opposite points in corresponding openings 12, as a mating piece for the plug base 8. In the embodiment according to FIGS. 2 to 4, the plug nipple 13 consists of two parts, namely, a post part 14 similar to a head rivet with a slightly conical pin shank 14a and a flat, rounded head 14b. The post part 14 is pushed into the opening 12 formed in the accessory 5, and a sleeve part 15 is slipped on the pin shank 14a with a press fit; the sleeve part 15 has a support flange 15a and an enlargement 15b at the free end thereof. The enlargement 15b has a width or a diameter which slightly exceeds the inside width or diameter of the plug opening 10 formed in the plug socket 18. The length of the sleeve part 15 is chosen in such a way that, after the plug nipple 13 and the plug socket 8 are plugged together, the enlargement 15b rests against the inner boundary edge of the plug socket 8 at the opening 10 and snaps-in at that location, as is clearly shown in FIG. 3. The wall of the accessory 5 is jammed between the post part 14 and the support part 15a of the sleeve part 15. The individual parts of the plug nipple 13 can be formed of metallic material. After the parts of the plug connection 6 are plugged together, a strong and clatter-proof joint between the helmet shell 1 and the accressory or shield 5, is obtained. This structure ensures that the outer surface of the helmet shell 1 does not touch any metallic parts of the plug connection, which could cause it to be damaged.

Figure 5:
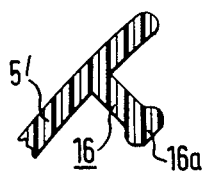
FIG. 5 is a fragmentary, cross-sectional view of another embodiment of the plug nipple of an accessory.

In the embodiment according to FIG. 5, a plug nipple 16 with an enlargement 16a is integrally formed on the accessory 5', a plastic material being preferably used. In order to make the plug connection 6 according to FIG. 5, only the plug socket 8 need be pressed into the openings 7 by hand.

Figure 6:
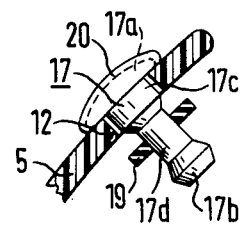
FIG. 6 is a view similar to FIG. 5 of a final embodiment of a plug nipple.

In the embodiment according to FIG. 6, a plug nipple 17 is plugged into openings 12 which are also provided in the accessory 5 at opposite points in each case. This plug nipple 17 has a rivet-like head 17a and an enlargement 17b. Adjacent the head 17a, the plug nipple 17 has a support shank 17c and a tapered section 17d adjacent thereto. The plug nipple 17 is essentially loosely supported in the opening 12 with the support shank 17c. A disc-like elastic securing element 19 which may be formed of rubber and holds the plug nipple 17 captively in the opening 12, is pushed onto the tapered section 17d. The securing element 19 is again formed of rubber or a rubber-like material. The plug nipple 17 itself can be constructed in the form of a shaped sleeve. As illustrated in FIG. 6, an ornamental cap 20 is placed on the flat head 17a of the plug nipple 17, in such a way that the rim of the ornamental cap 20 grips the underside of the head 17a, so that a durable mechanical joint is made.

The foregoing is a description corresponding in substance to German application No. P 34 09 786.4, filed Mar. 16, 1984, the International priority of which is being claimed for the instant application, and which is hereby made part of this application. Any material discrepancies between the foregoing specification and the aforementioned corresponding German application are to be resolved in favor of the latter.

I claim:

1. Safety helmet, comprising a helmet shell, at least one accessory, and at least one plug connection for connecting said accessory to said helmet shell being detachable with a given opening force, each plug connection including an elastic plug having a socket formed therein and being fixed in an opening formed in said helmet shell, and a plug nipple fastened to said accessory being insertible and rotatably lockable in said socket, said plug nipple being in the form of a sleeve-shaped part attached by a press fit to said accessory.

2. Safety helmet according to claim 1, wherein said plug has an annular shape and has a circumferential groove formed therein with which it snaps into said opening in said helmet shell.

3. Safety helmet according to claim 1, wherein said socket has a diameter being smaller than the maximum width of said plug nipple.

4. Safety helmet according to claim 3, wherein said plug nipple has an end disposed at said accessory and a free end, said free end having an enlargement with a width being greater than the diameter of said socket.

5. Safety helmet according to claim 1, wherein said sleeve-shaped part has a head with the shape of a head of a rivet.

6. Safety helmet, comprising a helmet shell, at least one accessory, and at least one plug connection for connecting said accessory to said helmet shell being detachable with a given opening force, each plug connection including an elastic plug having a socket formed therein and being fixed in an opening formed in said helmet shell, and a plug nipple fastened to said accessory being insertible and rotatably lockable in said socket, said plug nipple being formed of a rivet-shaped pin part with a head and a sleeve part joined to said pin part, said accessory being disposed between said pin and sleeve parts.

7. Safety helmet according to claim 6, wherein said pin part is loosely disposed in an opening formed in said accessory, and including a securing element disposed on said plug nipple holding said plug nipple on said accessory.

* * * * *